US011681346B2

(12) United States Patent
Lu

(10) Patent No.: US 11,681,346 B2
(45) Date of Patent: Jun. 20, 2023

(54) MODEM ENERGY MANAGEMENT SYSTEM AND METHOD

(71) Applicant: ARRIS ENTERPRISES LLC, Suwannee, GA (US)

(72) Inventor: Echo Lu, Hickory, NC (US)

(73) Assignee: ARRIS ENTERPRISES LLC, Suwannee, GA (US)

( * ) Notice: Subject to any disclaimer, the term of this patent is extended or adjusted under 35 U.S.C. 154(b) by 0 days.

(21) Appl. No.: 17/101,175

(22) Filed: Nov. 23, 2020

(65) Prior Publication Data

US 2021/0216128 A1 Jul. 15, 2021

Related U.S. Application Data

(63) Continuation of application No. PCT/CN2019/130361, filed on Dec. 31, 2019.

(51) Int. Cl.
*G06F 1/3209* (2019.01)
*H04W 52/02* (2009.01)
*G06F 1/3246* (2019.01)
*G06F 1/3234* (2019.01)

(52) U.S. Cl.
CPC .......... *G06F 1/3209* (2013.01); *G06F 1/3246* (2013.01); *G06F 1/3278* (2013.01); *H04W 52/0274* (2013.01)

(58) Field of Classification Search
CPC .... G06F 1/3209; G06F 1/3246; G06F 1/3278; H04W 52/0274
USPC ....................................................... 713/320
See application file for complete search history.

(56) References Cited

U.S. PATENT DOCUMENTS

| 5,446,904 A * | 8/1995 | Belt .................. G06F 1/3203 713/323 |
| 7,002,899 B2 | 2/2006 | Azenkot et al. |
| 2004/0057576 A1* | 3/2004 | Lavaud ................ H04M 19/08 379/413 |
| 2012/0226881 A1 | 9/2012 | Yi |

(Continued)

FOREIGN PATENT DOCUMENTS

| CN | 101924964 A | 12/2010 |
| CN | 107272874 A | 10/2017 |

OTHER PUBLICATIONS

PCT Search Report and Written Opinion in International Application No. PCT/CN2019/130361, dated Jul. 15, 2020 (9 pages).

*Primary Examiner* — Chun Cao
(74) *Attorney, Agent, or Firm* — Wenderoth, Lind, Ponack, L.L.P.

(57) ABSTRACT

A system and method for modem energy management utilizing a controller that is responsive to both a user-configurable timing system and a data activity sensor. The disclosed technology provides a configurable interface that enables a user to specify the parameters governing the modem assuming a low-power or sleep state, as well as a monitor adapted to detect the occurrence and rate of user data, video, Wi-Fi, voice and other services. The parameters a user may specify include elapsed time since the last detected data use, the rate of data being transmitted/received by the modem, the time of day and/or the day of the week. The system and method also permit a user to manually initiate the assumption of a low-power or a full-power mode by a modem.

16 Claims, 2 Drawing Sheets

(56) References Cited

U.S. PATENT DOCUMENTS

| | | | | |
|---|---|---|---|---|
| 2013/0121172 A1* | 5/2013 | Cheng | ............... | H04W 52/0222 |
| | | | | 370/252 |
| 2014/0153460 A1* | 6/2014 | Shrivastava | .......... | H04W 56/00 |
| | | | | 370/311 |
| 2014/0321463 A1* | 10/2014 | Denney | ............. | H04W 52/0219 |
| | | | | 370/390 |
| 2015/0362974 A1* | 12/2015 | Chau | ....................... | G06F 1/325 |
| | | | | 713/322 |
| 2016/0205264 A1* | 7/2016 | Kerpez | ................ | H04B 15/005 |
| | | | | 379/406.01 |
| 2016/0212036 A1* | 7/2016 | Oksman | ................ | H04L 7/0091 |
| 2020/0323032 A1* | 10/2020 | Kim | .................. | H04W 52/0274 |

* cited by examiner

MODEM ENERGY MANAGEMENT SYSTEM AND METHOD

CROSS-REFERENCE TO RELATED APPLICATIONS

This application is a continuation application of International Application No. PCT/CN2019/130361, filed Dec. 31, 2019, and entitled "MODEM ENERGY MANAGEMENT SYSTEM AND METHOD", which is hereby incorporated by reference in its entirety.

BACKGROUND OF THE INVENTION

The ever-increasing utilization of broadband data communication technology and the advent of the Internet-of-Things has led to the almost ubiquitous use of cable and optical modems to provide end user connectivity in both business and residential environments. These modems, which enable two-way data transmissions between service providers and end users, typically include sophisticated high-speed data controllers and processors.

Typically, once an optical or cable modem is installed and set-up within a particular environment, the modem remains in an always-on state, with the associated controllers/processors in an active mode prepared to modulate/demodulate or otherwise manage bidirectional data transmissions. This always-on state ensures that the modem will properly receive, transmit or otherwise manage any incoming or outgoing data. However, this also leads to the components within the modem being maintained at a fully-active state at all times and therefore continuously consuming power. As previously stated, optical and cable modem components include one or more high-speed processors/controllers, and consequently the amount of power required by a fully-active modem can be significant.

Although cable and optical modems are typically operated in a continuous, fully-active state, the transmission of data in most modem environments is sporadic. Peak data flows may occur during normal business hours in commercial environments, or perhaps during evenings or weekends in residential environments. Incoming data may surge during the downloading of a movie, and an increase in bidirectional data could occur during a video conference. Contrastingly, data usage could drop to near zero during overnight hours (for both residential and commercial environments), or during business hours for a residential environment. However, almost regardless of the particular data usage scenario, it is inherently inefficient to maintain a modem in an always-on state. Having a user power down a modem after a particular data use period, or power up a modem in anticipation of use is impractical and inconvenient for a host of reasons. For example, data usage can be unpredictable, modems are often situated in places that make manual control inconvenient, users do not want to wait for a modem to power-up and initialize prior to every data transmission/reception.

Present modem technology is ill-suited to provide for a modem that autonomously assumes a low-power state during periods of low data use, and switches to a full-power on state to support expected high data transmission and reception.

BRIEF SUMMARY OF THE INVENTION

A system and method for modem energy management utilizing a controller that is responsive to both a user-configurable timing system and a data activity sensor. The invention includes a configurable interface that enables a user to specify the parameters governing the modem assuming a low-power or sleep state, as well as a monitor adapted to detect the occurrence and rate of user data, video, Wi-Fi, voice and other services. The parameters a user may specify include elapsed time since the last detected data use, the time of day and/or the day of the week. The system and method also permit a user to manually initiate the assumption of a low-power or a full-power mode by a modem.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
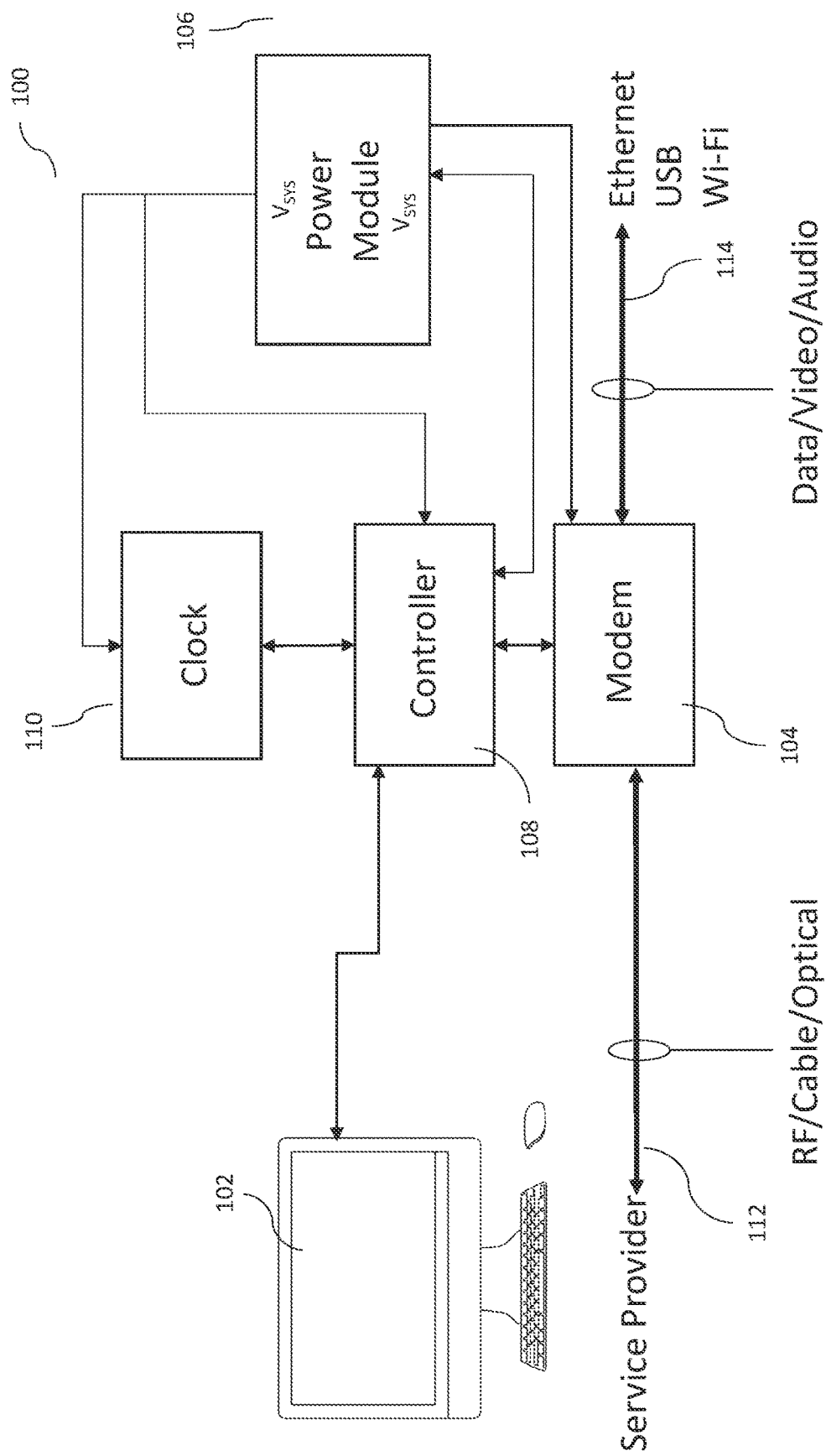
FIG. 1 is a functional block diagram of the primary components of a preferred embodiment of a modem energy management system.

FIG. 1 is a functional block diagram of a modem power management system employing a user interface 102. The system includes modem 104, power module 106, controller 108, clock 110. As shown, modem in connected to send data to and receive data from a service provider via bidirectional service provider line 112. Line 112 is typically an RF, cable or optical line. Modem 104 is also connected to an end user network via user data line 114. User data line 114 would typically be linked to an Ethernet, USB or Wi-Fi system at a user location. Modem 104 serves as the conduit between bidirectional service provider line 112 and user data line 114, demodulate and modulated transmitted and received data streams as required for the service provider and user systems.

Controller 108 is communicatively linked to modem 104 so receive information indicative of the data activity being supported by the modem, and to provide control signals to modem 104 governing the modulation and demodulation processes within that component. Controller 108 comprises a programmable digital microprocessor, as well as associated software, memory and interface circuitry typically required for operation and support. Such microprocessor-based systems are well-known in the art and will not be discussed in detail.

Controller 108 is also connected to clock 110 and user interface 102. Clock 110 is adapted to measure the duration of the period of time ($T_{LOW}$) that the rate of data passing through modem 104 remains below a predetermined threshold value, $R_{MIN}$. $R_{MIN}$ can be pre-programmed into controller 108, or set by a user via user interface 102. The user can, for example, set the value of $R_{MIN}$ by entering a specific minimum threshold data rate, choosing from a menu of predetermined threshold data rates, or specifying a minimum threshold rate as a function of the present data rate measured by controller 108 or of previously attained system data rates stored in the memory associated with controller 108. The user may also employ user interface 102 and controller 108 to set $R_{MIN}$ as a function of the time of day, day of the week, or the date. For example, controller 108 may be programmed by the user to set $R_{MIN}$ to a first value between 9:00 AM and 5:00 PM, and to a second, different value between 5:00 PM and 9:00 AM, or to set $R_{MIN}$ to a first value on weekdays and to a second, different value on weekends. A user may also choose to set $R_{MIN}$ to zero. Upon the determination by controller 108 that the rate of data passing through modem 104 has fallen below $R_{MIN}$, clock 110 is triggered and time during which the data rate remains below the threshold rate, $T_{LOW}$, is measured.

The measured duration of $T_{LOW}$ is then compared to the duration of a predetermined minimum period of low data activity ($P_{LOW}$). As with $R_{MIN}$, $P_{LOW}$ can be pre-programmed into controller 108, or set by a user via user interface 102. The user can also set the value of $P_{LOW}$ as a function of the time of day, day of the week, or the date. If duration of $T_{LOW}$ is found by controller 108 to exceed the period $P_{LOW}$, controller 108 instructs modem 104 to enter into a low-power sleep state. In this low-power the modem ceases to modulate or demodulate and consequently draws a lower amount of power from power module 106. Controller 108 will maintain modem 104 in the low-power sleep mode for a fixed period of time $T_{SLEEP}$. $T_{SLEEP}$ can be a fixed time, or the user can set the value of $T_{SLEEP}$ via user interface 102, the termination of the period of low-power modem operation can be a function of the time of day and/or the day of the week. In addition, the user, via user interface 102, may manually instruct controller 108 to shift the modem in to or out of a low-power sleep mode regardless of the rate of data passing through modem 104.

Figure 2:
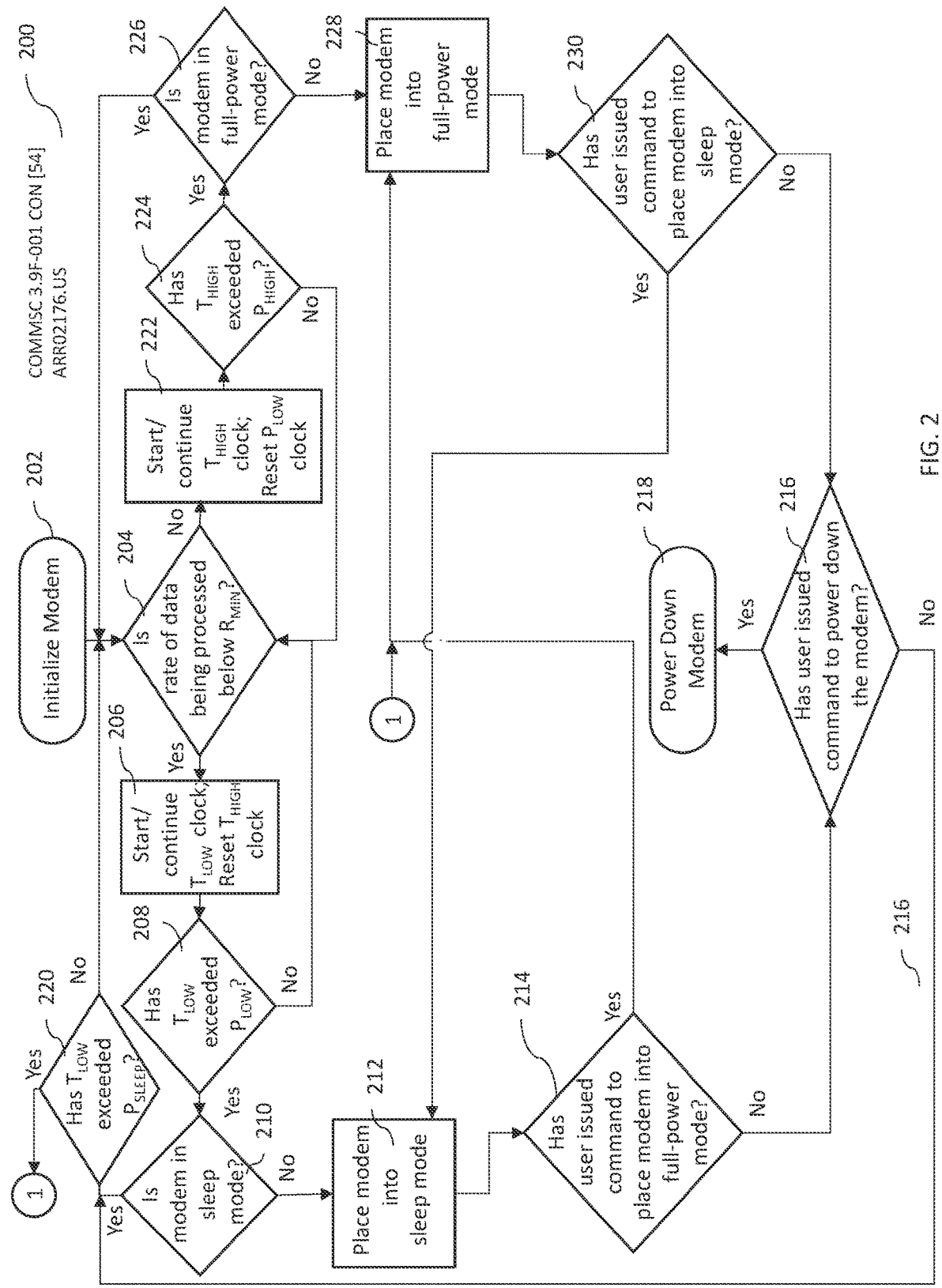
FIG. 2 is a flow diagram of operational steps executed within the system of FIG. 1.

A method and process (200) wherein the detected data rate is described above for controlling the system of FIG. 1 is illustrated in FIG. 2. As shown, after initialization of the modem (step 202), the rate of data being processed by modem 104 is compared by controller 108 to $R_{MIN}$ (step 204). If the data rate is found to be below $R_{MIN}$, then in step 206 the $T_{LOW}$ clock is started (or continued if it was already running), and any clocking of $T_{HIGH}$ is reset to zero by controller 108. Controller 108 then checks to see if $T_{LOW}$, as measured by clock 110, has exceeded duration $P_{LOW}$ (step 208). If not, then the process continues with step 204. However, if $T_{LOW}$ has exceeded $P_{LOW}$, controller 108 then determines if modem 104 is in sleep mode (step 210). If the modem is already in sleep mode, the process continues with step 204. In the event that modem 104 is not in sleep mode, it is placed in sleep mode at step 212. Controller 108 then checks to see if the user has manually initiated a command instructing modem 104 to be placed into full-power mode (step 214). Such a command could be initiated from user interface 102, of by actuating a switch on the body of the modem itself (such as the Wi-Fi Protected Setup, WPS, switch which is commonly found on modems). If so, the process continues with step 228. If not, then controller 108 determines if the user has manually issued a command to power down modem 104 (step 216). If so, the modem is powered down (step 218), and if not, the process continues with step 204. If not, the process continues with step 220 and the controller checks to see if $T_{LOW}$ has exceed the predetermined limit $P_{SLEEP}$. If so, then the process continues with step 228; if not, the process continues with step 204.

If at step 204 the rate of data being processed by modem 104 is determined to be at or above $R_{MIN}$ (step 204), then in step 222 the $T_{HIGH}$ clock is started (or continued if it was already running), and any clocking of $T_{LOW}$ is reset to zero by controller 108. Controller 108 then checks to see if $T_{HIGH}$, as measured by clock 110, has exceeded duration $P_{HIGH}$ (step 224). If not, then the process continues with step 204. However, if $T_{HIGH}$ has exceeded $P_{HIGH}$, controller 108 then determines if modem 104 is in full-power mode (step 226). If the modem is in full-power mode, the process continues with step 204. In the event that modem 104 is not in full-power mode, it is placed in sleep mode at step 228. Controller 108 then checks to see if the user has manually initiated a command instructing modem 104 to be placed into sleep mode (step 230). Such a command could be initiated from user interface 102, of by actuating a switch on the body of the modem itself. If so, the process continues with step 212. If not, then the process continues with step 216.

The disclosed invention offers many advantages, including the ability to permit the user to configure the minimum data rate ($R_{MIN}$) and the various threshold durations ($P_{LOW}$, $P_{HIGH}$), and to configure the controller to vary these thresholds and durations as a function of time, day, date, or other parameter(s) provided to the controller. The user is also provided a simple means of issuing a command to place the modem into a sleep or fully-powered state regardless of the present data processing rate. The invention also enables this configuration and to be performed via a user interface. This interface may be a device that is physically connected to the controller, or a networked device communicating with the controller via the Internet or a wireless or cellular network (i.e., a mobile device).

Although the invention herein has been described with reference to particular embodiments, it is to be understood that these embodiments are merely illustrative of the principles and applications of the present invention. For example, the clock and the controller were depicted as separate devices, this depiction is in no way intended to limit the scope of the disclosure. Various functional aspects of the invention could be implemented via physical arrangements that might have varying degrees of integration. The entirety of the disclosed invention could be implemented within a monolithic circuit, or disparate discrete components without departing from the spirit and scope of the present invention as defined by the appended claims.

The invention claimed is:

1. A modem energy management system comprising:
   a power module; and
   a controller adapted to:
   measure a rate at which data is being processed by a modem;
   determine that the rate is below a predetermined level $R_{MIN}$;
   measure a duration of time $T_{LOW}$ that the rate remains below $R_{MIN}$; and
   place the modem in a low power mode in response to the duration of $T_{LOW}$ exceeding a predetermined minimum low-use period $P_{LOW}$, wherein the modem ceases to perform any further modulation or demodulation of data, thereby drawing a reduced level of power from the power module.

2. The system of claim 1 wherein the modem is a cable modem.

3. The system of claim 1 wherein the modem is an optical modem.

4. The system of claim 1 further comprising a user interface in communication with the controller and adapted to transmit user commands to the controller, the user commands comprising at least one of:
   the setting of $R_{MIN}$;
   the setting of $P_{LOW}$;
   placing of the modem into low power mode;
   taking the modem out of low power mode; and
   powering down the modem.

5. The system of claim 4 wherein the user command for taking the modem out of low power mode comprised actuating a Wi-Fi protected set-up button.

6. The system of claim 1 wherein the controller is further adapted to take the modem out of the low power mode after a predetermined period of time $P_{SLEEP}$.

7. The system of claim 6 further comprising a user interface in communication with the controller and adapted to transmit user commands to the controller, the user commands comprising at least instructions for the controller to set the value of $P_{SLEEP}$.

8. The system of claim 7 wherein the user interface comprises at least one of:
    a personal computer;
    a mobile device; and
    a smart phone.

9. A method for modem energy management system comprising the steps of:
    measuring a rate at which data is being processed by a modem;
    determining that the measured rate is below a predetermined level $R_{MIN}$;
    measuring a duration of time $T_{LOW}$ that the rate remains below $R_{MIN}$; and
    placing the modem in a low power mode in response to the duration of $T_{LOW}$ exceeding a predetermined minimum low-use period $P_{LOW}$, wherein the modem ceases to perform any further modulation or demodulation of data, thereby drawing a reduced level of power from a power module.

10. The method of claim 9 wherein the modem is a cable modem.

11. The method of claim 9 wherein the modem is an optical modem.

12. The method of claim 9 further comprising the step of transmitting commands from a user interface to a controller, the user commands comprising at least one of:
    the setting of $R_{MIN}$;
    the setting of $P_{LOW}$;
    placing of the modem into low power mode;
    taking the modem out of low power mode; and
    powering down the modem.

13. The method of claim 12 wherein the user command for taking the modem out of low power mode comprised actuating a Wi-Fi protected set-up button.

14. The method of claim 9 further comprising the step of taking the modem out of the low power mode after a predetermined period of time $P_{SLEEP}$.

15. The method of claim 14 further comprising the step of transmitting commands from a user interface wherein the commands comprise at least instructions for setting the value of $P_{SLEEP}$.

16. The method of claim 12 wherein the user interface comprises at least one of:
    a personal computer;
    a mobile device; and
    a smart phone.

* * * * *